(12) United States Patent
Urbani et al.

(10) Patent No.: US 9,050,768 B2
(45) Date of Patent: Jun. 9, 2015

(54) METHOD AND DEVICE FOR PRODUCING A SUPPORT BELT FOR AN ELEVATOR INSTALLATION

(75) Inventors: Franco Urbani, San Carlo Canavese (IT); Ernst Ach, Ebikon (CH)

(73) Assignee: Inventio AG, Hergiswil (CH)

( * ) Notice: Subject to any disclaimer, the term of this patent is extended or adjusted under 35 U.S.C. 154(b) by 808 days.

(21) Appl. No.: 12/937,572

(22) PCT Filed: Apr. 14, 2008

(86) PCT No.: PCT/EP2008/054488
§ 371 (c)(1),
(2), (4) Date: Jan. 5, 2011

(87) PCT Pub. No.: WO2009/127241
PCT Pub. Date: Oct. 22, 2009

(65) Prior Publication Data
US 2011/0088981 A1   Apr. 21, 2011

(51) Int. Cl.
*B66B 7/06*   (2006.01)
*B29D 29/00*   (2006.01)
(Continued)

(52) U.S. Cl.
CPC ......... *B29D 29/10* (2013.01); *Y10T 428/24612* (2015.01); *B29B 15/122* (2013.01); *B29C 37/0067* (2013.01); *B29C 43/26* (2013.01); *B29C 43/28* (2013.01); *B29C 43/3697* (2013.01); *B29C 43/46* (2013.01); *B29K 2105/08* (2013.01); *B29L 2029/00* (2013.01); *B29L 2031/7094* (2013.01); *B66B 7/062* (2013.01); *D07B 1/162* (2013.01); *D07B 1/22* (2013.01); *D07B 5/005* (2013.01); *D07B 7/145* (2013.01);

(Continued)

(58) Field of Classification Search
CPC ............... F16G 1/14; F16G 1/16; F16G 1/21; F16G 1/26
USPC .................. 187/251, 254; 156/137, 138, 139; 425/115; 264/171.13
See application file for complete search history.

(56) References Cited

U.S. PATENT DOCUMENTS 4,701,154 A * 10/1987 Rausch .......................... 474/205
6,739,433 B1 * 5/2004 Baranda et al. ............... 187/411
(Continued)

FOREIGN PATENT DOCUMENTS

DE          3527640 A1    2/1987
DE         10222015 A1   12/2003
(Continued)

*Primary Examiner* — William E Dondero
*Assistant Examiner* — Diem Tran
(74) *Attorney, Agent, or Firm* — Fraser Clemens Martin & Miller LLC; William J. Clemens

(57) ABSTRACT

A process for producing a support belt for an elevator system includes steps of: placing at least one cable-shaped tension support in position; embedding the tension support in a first belt layer made from a first plasticizable material to produce a partial belt having a first outer surface and a surface which forms a connecting plane, wherein parts of the tension support project out of the connecting plane and at least parts of the projecting portion of the tension support are covered by the first plasticizable material; and integrally forming a second belt layer made from a second plasticizable material on the connecting surface of the partial belt and the projecting portions of the tension support so as to produce a support belt having the first outer surface on the side of the first belt layer and a second outer surface on the side of the second belt layer.

15 Claims, 7 Drawing Sheets

(51) Int. Cl.
- *B29D 29/10* (2006.01)
- *B29B 15/12* (2006.01)
- *B29C 37/00* (2006.01)
- *B29C 43/26* (2006.01)
- *B29C 43/28* (2006.01)
- *B29C 43/36* (2006.01)
- *B29C 43/46* (2006.01)
- *D07B 5/00* (2006.01)
- *D07B 7/14* (2006.01)
- *B29K 105/08* (2006.01)
- *B29L 29/00* (2006.01)
- *B29L 31/00* (2006.01)
- *D07B 1/16* (2006.01)
- *D07B 1/22* (2006.01)

(52) U.S. Cl.
CPC . *D07B 2201/2087* (2013.01); *D07B 2201/2093* (2013.01); *D07B 2501/2007* (2013.01)

(56) References Cited

U.S. PATENT DOCUMENTS

| | | | |
|---|---|---|---|
| 7,926,649 B2 * | 4/2011 | Goser | 198/847 |
| 2007/0249451 A1 * | 10/2007 | Wu et al. | 474/263 |
| 2012/0015187 A1 * | 1/2012 | O'Donnell et al. | 428/378 |
| 2015/0024891 A1 * | 1/2015 | Allwardt et al. | 474/204 |

FOREIGN PATENT DOCUMENTS

| | | |
|---|---|---|
| DE | 102004030722 A1 | 1/2006 |
| DE | 102005044988 A1 | 3/2007 |
| EP | 1396458 A2 | 3/2004 |
| EP | 1886797 A1 | 2/2008 |
| EP | 1886958 A1 | 2/2008 |
| EP | 1886960 A1 | 2/2008 |
| WO | WO 2006000500 A1 * | 1/2006 |
| WO | 2007032763 A1 | 3/2007 |
| WO | 2007033721 A1 | 3/2007 |

* cited by examiner

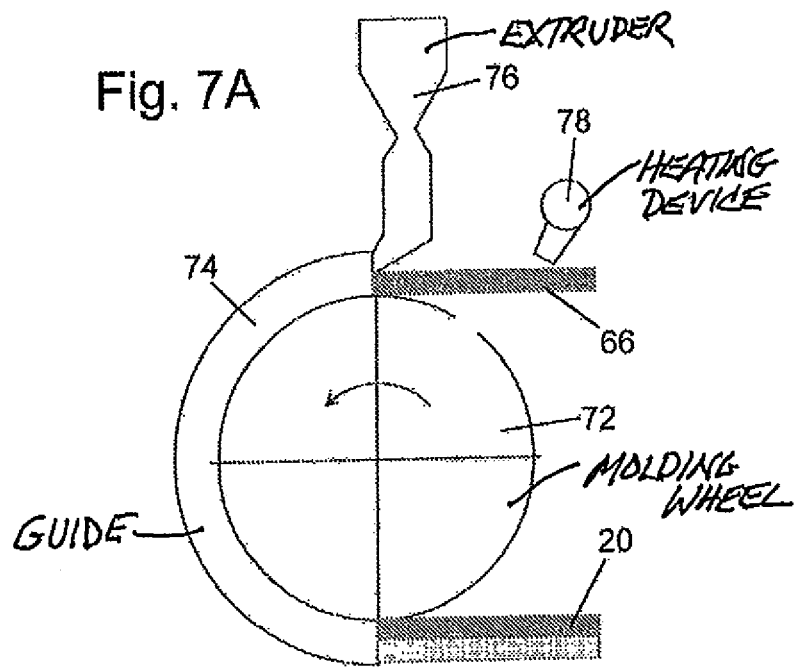
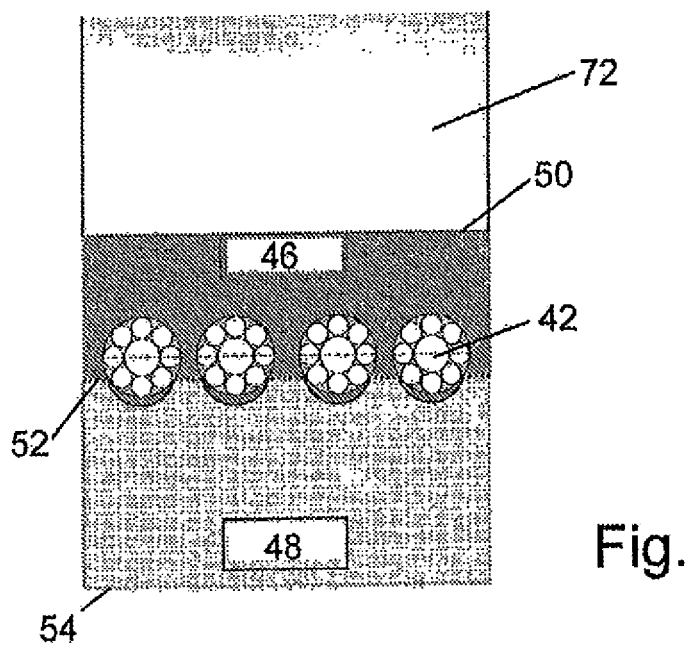

METHOD AND DEVICE FOR PRODUCING A SUPPORT BELT FOR AN ELEVATOR INSTALLATION

FIELD OF THE INVENTION

The present invention relates to a method of producing a support belt for an elevator installation, to a corresponding device for producing a support belt, to a support belt and to an elevator installation with such a support belt.

BACKGROUND OF THE INVENTION

An elevator installation usually includes at least one elevator car or platform for transporting persons and/or goods, a drive system with at least one drive motor for moving the at least one elevator car or platform along a travel path and at least one support means for supporting the at least one elevator car or platform and transmitting the forces from the at least one drive motor to the at least one elevator car or platform. Cable-like support means (wire cables), chain-like support means and, increasingly in recent times, also belt-like support means (support belts) currently come into question as support means for mechanical drives.

In the case of belt-like support means there are also known, inter alia, double-layer support means comprising a first belt layer and a second belt layer connected therewith. Several tensile carriers, particularly cable-like tensile carriers, are then usually embedded in the molded body of the support belt.

A method producing a double-layer support belt of that kind is disclosed in, for example, DE 102 22 015 A1. In this known method, initially a part-belt forming the first belt layer and then a finished support belt with molded-on second belt layer are produced in two production stations integrally connected one behind the other. Several cable-like tensile carriers, which are embedded to the extent of up to half in the first belt layer, are simultaneously fed to the first production station. First and second belt layers of the support belt are each formed by means of an extrusion process.

In addition, WO 2007/032763 A1 describes a production method for a double-layer support belt in which the first belt layer and the second belt layer are formed in a production station and at the same time the tensile carriers are embedded in the second belt layer.

Finally, WO 2007/033721 A1 shows a two-stage production method for a single-layer support belt. The molded body of the support belt is formed by an extrusion process in the first production station and at the same time several tensile carriers are embedded therein. One outer side of the support belt body is then provided in the second production station, which directly adjoins thereat, with a profile in the form of wedge ribs extending in longitudinal direction.

SUMMARY OF THE INVENTION

It is a first object of the present invention to create an improved production method for a support belt for an elevator installation.

It is a second object of the present invention to create an improved production device for a support belt for an elevator installation.

It is a further object of the present invention to create an improved support belt for an elevator installation.

The method for production of a support belt for an elevator installation includes the steps of placing at least one cable-like tensile carrier; embedding the at least one cable-like tensile carrier in a first belt layer of a first plasticizable material in such a manner that a part-belt with a first outer surface and a surface forming a connecting plane arises, in which the at least one tensile carrier protrudes partly out of the connecting plane of the part-belt and the protruding section of the at least one tensile carrier is covered at least in part with the first plasticizable material; and molding on a second belt layer of a second plasticizable material at the connecting plane of the part-belt and the protruding sections of the at least one tensile carrier in such a manner that a support means with the first surface on the side of the first belt layer and a second outer surface on the side of the second belt layer arises.

The tensile carriers are in this method embedded as fully as possible in the first plasticizable material of the first belt layer so that the second plasticizable material for the second belt layer does not come into contact with the tensile carriers. Since the tensile carriers protrude from the connecting plane between the two belt layers the connecting surface formed in the embedding step from the first plasticizable material of the first belt layer has a larger area so that a good connection between the first and second belt layers can be achieved.

In one embodiment of the invention the area of the at least one tensile carrier in the embedding step is covered to at least 80%, preferably at least 90%, particularly preferably at least 95%, with the first plasticizable material. In that case, preferably also the free spaces within the at least one tensile carrier are filled in the embedding step at least partly with the first plasticizable material.

The same materials, the same materials with different characteristics or different materials can be selectably used for the first belt layer and the second belt layer. By the term "same materials" there are to be understood materials of the same synthetic material category (for example, PUR, EPDM). "Same materials with different characteristics" are thus materials of the same synthetic material category which, in consequence of different production parameters or of different additives (for example, graphite, wax), have different characteristics.

In a further embodiment of the invention the surface of the part-belt forming the connecting plane is provided at least in part with a surface structure prior to the molding-on step of the second belt layer, whereby the area of the connecting plane is increased and thus a better connection with the second belt layer, which is to be molded on later, is produced. The surface structure at the connecting surface is in that case preferably constructed during the embedding step.

In a further embodiment of the invention the first outer surface and/or the second outer surface is or are constructed with at least one rib extending in longitudinal direction of the support means. The construction of the ribs also preferably takes place during the embedding step or during the molding-on step.

In yet another embodiment of the invention the embedding step is performed as an extrusion process with extrusion of the first plasticizable material and the molding-on step is performed as an extrusion process with extrusion of the second plasticizable material.

In a further embodiment of the invention the first belt layer and the second belt layer are formed by the same or different process parameters (for example temperature, pressure, rotational speed of the molding wheel, etc.), which are each optimally matched to the first or second plasticizable material.

In another embodiment of the invention the at least one tensile carrier is placed under bias during the embedding step.

For better connection of the tensile carrier with the first belt layer the at least one tensile carrier is preferably heated during the embedding step and for better connection of the first belt layer with the second belt layer the connecting surface of the part-belt is preferably heated during the molding-on step.

The device for producing a support belt for an elevator installation comprises a first production station for forming a part-belt with a first outer surface and a surface forming a connecting plane and a second production station for forming the support belt with the outer surface and a second outer surface. The first production station comprises a first molding wheel, a first guide looping around a part-circumference of the first molding wheel, equipment for feeding at least one cable-like tensile carrier to the first molding wheel and a first extruder for feeding a first plasticizable material into a mold cavity formed between the first molding wheel and the first guide. The second production station comprises a second molding wheel, a second guide looping around a part-circumference of the second molding wheel, equipment for feeding the part-belt, which is produced in the first production station, to the second molding wheel and a second extruder for feeding a second plasticizable material into a mold cavity formed between the second molding wheel and the second guide. According to the invention the circumferential surface of the first molding wheel of the first production station is constructed with at least one longitudinal groove, which extends in circumferential direction of the first molding wheel and into which the at least one fed tensile carrier is guided, the longitudinal groove being so dimensioned that in the part-belt produced in the first production station the at least one tensile carrier protrudes partly out of the connecting plane and the protruding section of the at least one tensile carrier is at least partly covered with the first plasticizable material.

The same effects and advantages as with the above-described production method can be achieved with this device.

In one embodiment of the invention a width of the longitudinal grooves of the circumferential section of the first molding wheel is selected to be smaller than a diameter of the tensile carrier, wherein the width of the longitudinal grooves preferably lies in a range of approximately 70% to 95%, particularly preferably in a range of approximately 75% to 90%, of the diameter of the tensile carrier. In addition, a depth of the longitudinal grooves of the circumferential surface of the first molding wheel preferably lies in a range of approximately 25% to 50%, particularly preferably in a range of approximately 30% to 40% of the diameter of the tensile carrier.

In a further embodiment of the invention the first production station further comprises a device for feeding the at least one tensile carrier to the first molding wheel under bias and a first heating device for heating the at least one tensile carrier prior to the feed thereof to the first molding wheel.

In yet another embodiment of the invention the first guide of the first production station is so formed at its side facing the first molding wheel that it gives to the first outer surface of the part-belt or of the support belt a profile having, for example, the form of wedge ribs.

In yet another embodiment of the invention the first molding wheel is provided at its circumferential surface in the region between the longitudinal grooves with a structure so as to give a surface structure to the surface of the part-belt forming the connecting plane. This surface structure produces an enlargement of the area of the said connecting plane, whereby a better connection between the first and the second belt layers of the support belt is achieved.

In a further embodiment of the invention the second production station further comprises a second heating device for heating the part-belt prior to the feed thereof to the second molding wheel and the second guide of the second production station is so formed at its side facing the second molding wheel that it gives to the first outer surface of the part-belt or of the support belt a profile having, for example, the form of wedge ribs.

By the term "belt-like support means" there is to be understood all kinds of flexible tensile means, which do not have a circular cross-section, are sufficiently flexible in order to be able to be guided over driving or deflecting pulleys and in that case can transmit forces between components of an elevator installation.

The belt-like support means for an elevator installation (subsequently frequently denoted simply by "support belt") comprises a first belt layer of a first plasticizable material with a first outer surface and a surface forming a connecting plane, at least one cable-like tensile carrier which is so embedded in the first belt layer that it protrudes partly out of the connecting plane of the first belt layer and the protruding section of the at least one tensile carrier is covered at least in part with the first plasticizable material, and a second belt layer of a second plasticizable material, which is molded on at the connecting plane of the first belt layer and the protruding sections of the at least one tensile carrier and which forms a second outer surface of the support belt.

The same effects and advantages can be achieved with the thus-constructed support belt as have been cited above in connection with the production method.

In one embodiment of the invention the area of the at least one tensile carrier is covered with the first plasticizable material to at least 80%, preferably at least 90%, particularly preferably at least 95%, and the free spaces within the at least one tensile carrier are filled at least partly with the first plasticizable material.

The first belt layer and the second belt layer of the support belt can selectably be formed from the same material, the same material with different characteristics or from different materials.

In one embodiment of the invention the first outer surface of the first belt layer is constructed with at least one rib, which extends in longitudinal direction of the support means and is preferably constructed in the form of a wedge rib and which has a flank angle between 60° and 120°, preferably between 80° and 100° and/or is constructed with a flattened tip.

In a further embodiment of the invention the second outer surface of the second belt layer is constructed with at least one rib, which extends in longitudinal direction of the support means and is preferably constructed in the form of a wedge rib and which has a flank angle between 60° and 100°, preferably between 80° and 100° and/or is constructed with a flattened tip.

In yet a further embodiment of the invention the ratio of the total height of the support belt to the total width of the support belt is greater than 1. Alternatively, this ratio can, however, be approximately 1 or less than 1.

The elevator installation of the invention has at least one elevator car or platform for transporting persons and/or goods, a drive system with at least one drive motor for moving the at least one elevator car or platform along a travel path and at least one support means for supporting the at least one elevator car or platform and for transmitting the forces from the at least one drive motor to the at least one elevator car or platform.

The at least one support means is preferably a belt-like support means according to the present invention or a belt-like support means produced in accordance with the production method of the invention.

The elevator installation comprises a drive system, preferably in the form of a driving pulley drive or a drum drive.

DESCRIPTION OF THE DRAWINGS

The above as well as further features and advantages of the invention are better understandable from the following description of preferred, non-restrictive exemplifying embodiments with reference to the accompanying drawings, in which:

FIGS. 7A and 7B show schematic illustrations of the construction and mode of function of a second station for producing the support belt illustrated in FIG. 3;

DESCRIPTION OF PREFERRED EMBODIMENTS

1. Elevator Installation

Figure 1:
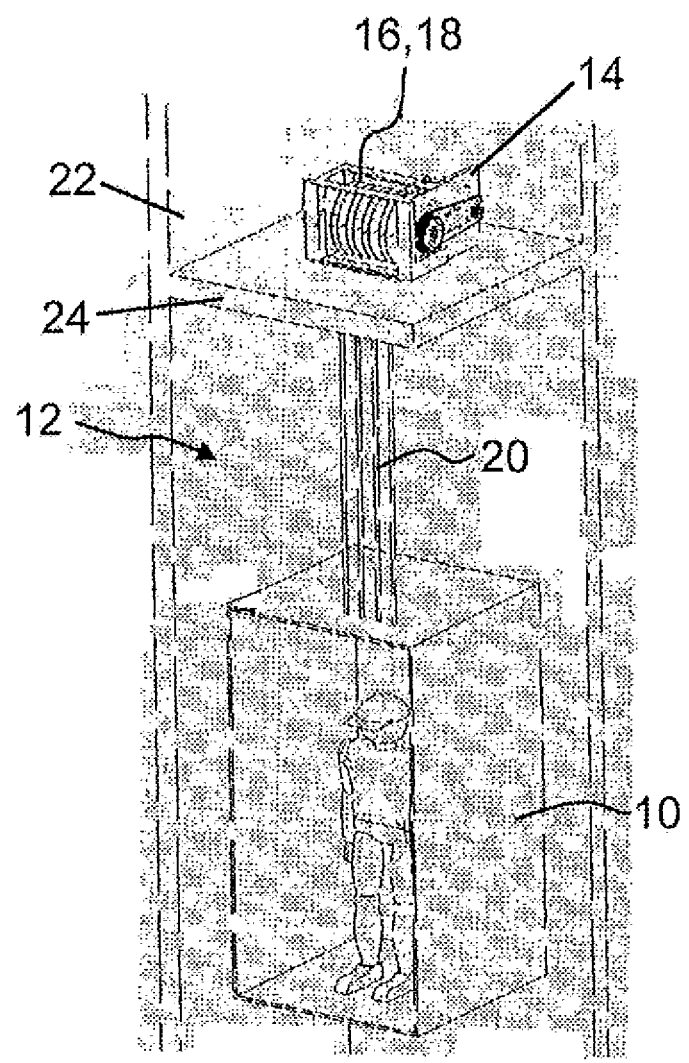
FIG. 1 shows a schematic illustration of the construction of an elevator installation according to the invention, with a drum drive.

An elevator installation according to the present invention can be constructed as a passenger elevator for the transport of persons and optionally also goods or as a goods elevator for exclusive transport of goods. The following description of the individual elevator components is undertaken in each instance on the basis of a design as a passenger elevator; however, the teaching according to the invention is basically also transferrable to goods elevators.

The elevator installation according to the invention comprises at least one elevator car or alternatively one or more movable platforms which are movable in vertical direction between fixed access points (particularly between floors of a building) and guided at least in sections along their travel paths. The elevator car is movable with the help of a drive system, wherein the drive system comprises one or more drive motors optionally operable independently of one another. The elevator car is optionally constructed to also be movable in horizontal direction or along an arcuate curved track with the help of the drive system.

With respect to drive systems distinction can basically be made between a mechanical drive system with use of a driving pulley or a drum, a hydraulic system and a so-called rack drive. The present invention relates particularly to elevator installations with a driving pulley drive or drum drives as drive system.

The construction of the drive system according to the invention in practice is described in detail further below.

1.1 Elevator Car

The elevator car represents one of the main subassemblies of the elevator system according to the invention and serves for the reception of persons and goods. Elevator cars are in general produced with a rectangular or square plan, but other car shapes are also possible, for example with a round plan or the like. At least one access to the elevator car is provided. In most cases the access to the elevator car is closable by a car door, without the present invention being restricted to this design of an elevator car.

At least one support means, which in an exemplifying embodiment is fastened indirectly or directly to the elevator car, serves for supporting and driving the elevator car. In modified exemplifying embodiments the support means is guided over deflecting pulleys mounted below or above the elevator car.

1.2 Counterweight

Particularly in the case of elevator installations with a driving pulley drive use is preferably made of a counterweight, which is guided at counterweight guide rails, for reducing the drive energy required. The counterweight in that case also serves the purpose of tightening the support means so as to enable transmission of a traction force between a driving pulley and the support means.

The weight of the counterweight is usually at most equal to the sum of the weight of the elevator car and half the maximum rated load of the elevator installation. Full compensation, in which the drive energy is supplied principally to overcome the frictional resistances in the system, is thus present in the case of loading the elevator car with half the rated load.

1.3 Elevator Shaft

According to the invention the car is arranged in an elevator shaft of a building, wherein it will be obvious that the presently described elevator system is also usable in larger mobile units such as ships or in mines.

The elevator shaft is a space which is bounded at several sides by vertical walls and in which the travel path of the elevator car is disposed. In preferred manner, the travel path of the counterweight is also disposed in the elevator shaft near the travel path of the elevator car.

A shaft head in the upper end region and a shaft pit in the lower end region of the elevator shaft also belong to the elevator shaft. Arranged in the shaft pit can be, for example, buffers for the elevator car and the counterweight.

1.4 Guide Rails

According to the invention guide rails for the elevator car and the counterweight, which securely and precisely guide the elevator car and the counterweight along the travel paths thereof in the elevator shaft, are arranged at the side walls of the elevator shaft. The guide rails at the same time serve as elements at which safety brake devices of the elevator car and/or the counterweight engage in the case of a safety braking process.

The elevator car is preferably equipped on two opposite sides respectively at the top and the bottom with a guide, for example in the form of guiding slide shoes and/or roller guide shoes, by which it is guided at the guide rails in the elevator shaft.

1.5 Safety Brake Device

One of the most important and oldest requirements for operation of elevator installations (particularly walk-in passenger elevators) is safety of the elevator car against falling down.

In general, currently two forms of safety brake devices are in use: the blocking safety brake device and the braking safety brake device. The blocking safety brake device is permitted only up to a specific operating speed, whilst the braking safety brake device is suitable for elevator installations with higher operating speeds.

Both kinds of safety brake device are fixedly connected with the elevator car or the counterweight. They usually consist of two safety brake housings with the safety brake elements (and, in particular, a respective safety brake housing for each of the two opposite guide rails), the transmission elements and the connecting elements for triggering the safety brake device. The two kinds of safety brake device are triggered by a speed limiter/regulator when a predetermined trigger speed is exceeded. As speed limiter distinction can be made between two forms of construction: pendulum regulators and centrifugal force regulators.

The basic function of both kinds is often the same: in the case of a safety braking process, wedges, rollers or the like are moved upwardly into the upwardly tapering wedge chambers of the safety brake housing. The elevator car is thereby firmly clamped to the guide rails of the elevator shaft or braked to a standstill.

At the same time, a safety brake switch is opened for interrupting the control and thus for shutting down the drive system.

1.6 Travel Shaft Doors and the Safety Devices Thereof

The travel shaft doors can be constructed in accordance with the respective kind and intended purpose of an elevator installation. The different forms of embodiment of travel shaft doors can be subdivided into panel doors (or single-panel and double-panel rotary doors), folding panel doors, horizontally moved sliding doors, vertically moved sliding doors and special constructions.

Door closures as important safety devices of elevator installations can be divided on the one hand according to the type of doors to be locked and on the other hand according to the type of locking means employed. Door closures with push locks or with flap door locks are, for example, known for rotary doors, and for horizontally moved sliding doors and for vertically moved sliding doors there are, for example, door closures with push locks or with hook locks.

The travel shaft doors and the door closures thereof are in that case usually coupled with the elevator car or the car doors thereof. For example, departure of the elevator car is to be possible only after closing of both doors and after complete locking of the respective travel shaft door.

1.7 Buffers

Particularly in the case of elevator installations with high operating speeds several buffers are provided in the region of the shaft pit in order to, for example, prevent an overly hard settling of the elevator car or, in a given case, of the counterweight on the floor of the shaft pit in the event of failure of the brake of the drive system or in the event of overrunning of the operational end settings of the elevator car.

The buffers can be constructed either as springs (energy-storing buffers) or to be hydraulically acting (energy-absorbing buffers).

2. Drive System

The construction of the already above-mentioned drive system will now explained in more detail.

2.1 Drum Drive

With reference to FIG. 1, initially the construction of an elevator installation with a drum drive is described more precisely.

The elevator installation comprises an elevator car 10 movable upwardly and downwardly in an elevator shaft 12. In that case the elevator car 10 is guided along vertical guide rails (not illustrated), for example at the walls of the elevator shaft 12. In order to move the elevator car 10 a drive 14 is provided which comprises, in particular, a drum 18 driven by a motor 16, wherein motor and drum are preferably constructed as an integral unit. A drive control (not illustrated) forming part of the elevator control controls the actions of the drum drive and thus the movement of the elevator car.

In order to support the elevator car 10 and transmit the forces from the drum 18 of the drive 14 to the elevator car 10 at least one support means 20 is present. In general, several parallelly extending support means 20 are present, as indicated in FIG. 1. One end of the or each support means 20 is fastened to the elevator car 10 and the other end of the or each support means 20 is fixed on the drum 18 of the drive 14. Movement of the elevator car 10 takes place by winding up the or each support means 20 on the drum 18 of the drive 14 or by unwinding the or each support means 20 from the drum, which is produced by rotation of this drum 18.

Whereas no counterweight is provided in the form of embodiment according to FIG. 1, such can also exist in the case of a drum drive. A counterweight is then coupled by way of a second support means with the drum 18 of the drive 14 in order to reduce the required driving forces of the motor 16.

The drive 14 is arranged in FIG. 1 in a machine room 22 above the elevator shaft 12, wherein the machine room 22 is separated from the elevator shaft 12 by a shaft ceiling 24, a crossbeam, a bridge or the like. However, elevator installations without a machine room are equally possible and the drive 14 can alternatively also be arranged near the elevator shaft 12. The drive 14 can, for example, also be fastened on the guide rails for the elevator car 10 and/or the counterweight.

2.2 Driving Pulley Drive

The construction of an elevator installation with a driving pulley drive is explained in more detail in the following with reference to FIGS. 2A and 2B. In that case, components which are present with the same action in the driving pulley drive as in the afore-described drum drive are denoted by the same reference numerals.

The elevator installation comprises an elevator car 10 which is movable upwardly and downwardly in an elevator shaft 12. In that case the elevator car 10 is guided along vertical guide rails (not illustrated), for example, at the walls of the elevator shaft 12. Provided for movement of the elevator car 10 is a drive 14 which comprises, in particular, a driving pulley 26 driven by a motor 16. Provided for supporting the elevator car 10 and for transmission of the driving forces from the drive 14 to the elevator car 10 is at least one support means 20, the two free ends of which are fastened to fastening points 28a and 28b in or at the elevator shaft 12. A drive control (not illustrated) forming part of the elevator control controls the actions of the driving pulley drive and thus the movement of the elevator car.

From the first fastening point 28a (on the left in FIGS. 2A and 2B) the support means 20 runs initially downwardly along the elevator shaft 12, loops around a counterweight support pulley 30 at which a counterweight 32 hangs, and runs upwardly again in direction towards the drive pulley 26 of the drive 14. After looping around the drive pulley 26 the support means 20 extends downwardly again and loops under the elevator car 10, which for this purpose has at its underside two car support pulleys 34a and 34b which are each looped around by the support means 20 by approximately 90°. The support means 20 subsequently runs along the elevator shaft 12 upwardly again to the second fastening point 28b.

The driving pulley 26 transmits the forces, which are produced by the motor 16, to the support means 20, which is coupled not only with the elevator car 10, but also with the counterweight 32. In that case, on rotation of the drive pulley 26 the elevator car 10 and the counterweight 32 move upwardly and downwardly by the support means 20 in opposite sense in the elevator shaft 12. FIG. 2A shows the elevator car 10 in its lower operating end setting (i.e. the counterweight 32 in its upper position) and FIG. 2B shows the elevator car 10 in its upper operating end setting (i.e. the counterweight 32 in its lower position).

A significant advantage of the driving pulley drive is the possibility, by virtue of the provided counterweight 32, to manage with comparatively low motor torques of the drive 14. Although not illustrated, the counterweight 32 is also usually guided along vertical guide rails, for example at the walls of the elevator shaft 12.

Buffers 38 for the elevator car 10 and buffers 40 for the counterweight 32 are usually arranged in the shaft pit 36 of the elevator shaft 12.

Figure 2A:
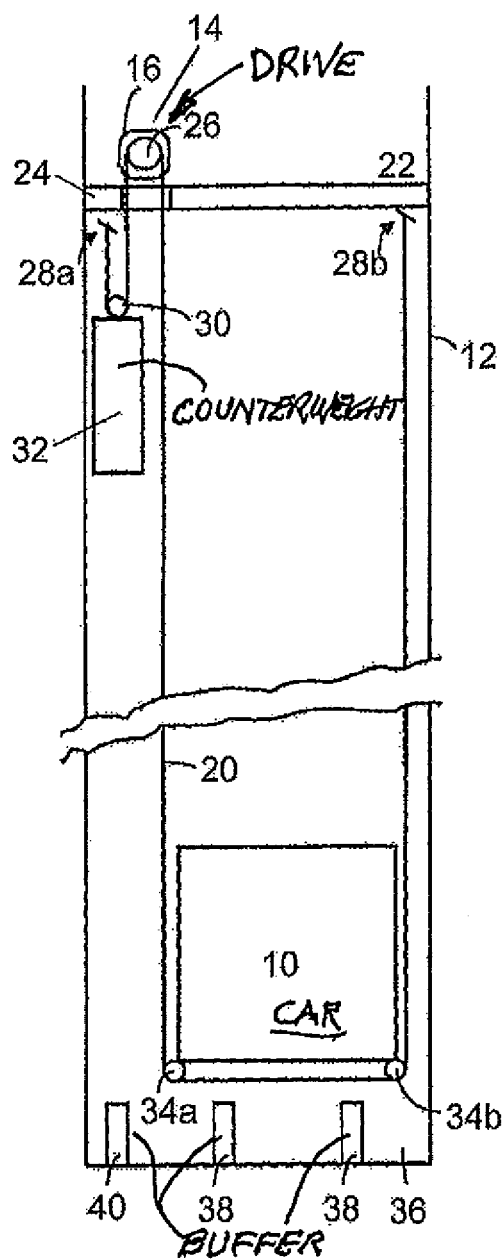
FIGS. 2A and 2B show schematic illustrations of the construction of an elevator installation according to the invention with a driving pulley drive, wherein an elevator car is disposed in a lower end position or in an upper end position in an elevator shaft.
Figure 2B:
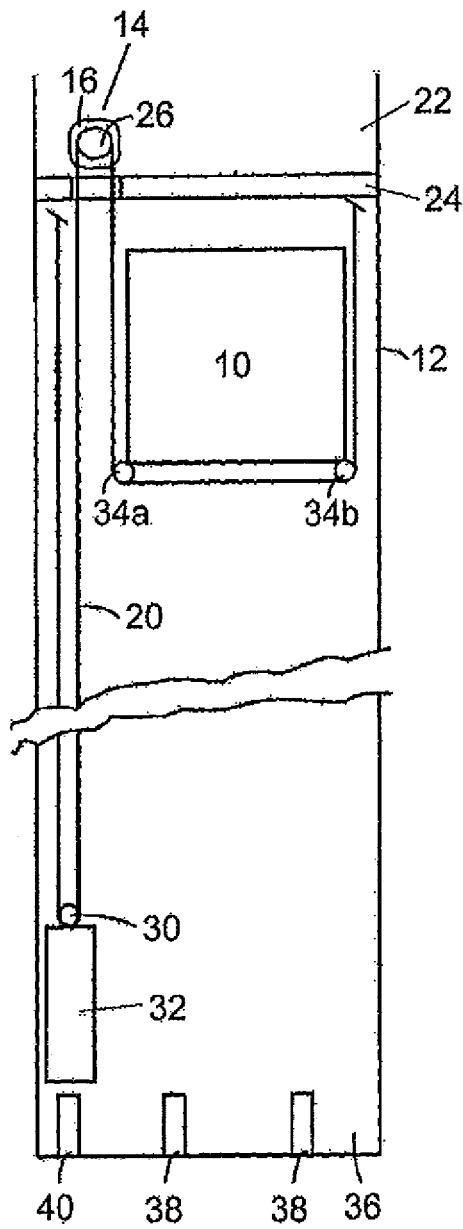

The construction of an elevator installation with driving pulley drive was explained by way of example in the foregoing with reference to FIGS. 2A and 2B; however, numerous variants are conceivable.

For example, it is also possible to mount the two car support pulleys 34a, 34b at the upper side of the elevator car 10 (analogously to the counterweight support pulley 30 in FIGS. 2A and 2B). In analogous manner the counterweight support pulley 30 can be mounted, instead of at the upper side of the counterweight 32 also below that so that the support means 20 loops under the counterweight 32. Moreover, the numbers of supporting pulleys are obviously not restricted only to the one counterweight support pulley 30 and the two car support pulleys 34a, 34b.

Whereas in each of FIGS. 2A and 2B only one support means 20 is illustrated, it is usual, particularly for safety reasons to provide several identical support means 20 which run parallel to one another in the above-described sense.

A 1:2 suspension of the elevator car 10 by the support means 20 is illustrated in FIGS. 2A and 2B. However, other support means arrangements such as, for example, a 1:4 suspension, a 1:8 suspension, etc., are also possible, in which the region, which is driven by the drive 14, of the support means 20 moves four, eight, etc., times as quickly as the elevator car 10. An elevator installation with a 1:4 suspension is described in detail in, for example, WO 2006/005215 A2 of the applicant, to which document reference is accordingly made in terms of the whole content with respect to the construction and the mode of function of a 1:4 suspension.

The drive 14 is, in FIGS. 2A and 2B, arranged in a machine room 22 above the elevator shaft 12, wherein the machine room 22 is separated from the elevator shaft 12 by a shaft ceiling 24, a crossbeam, a bridge or the like. However, elevator installations without a machine room are equally known and the drive 14 can alternatively also be arranged below the elevator shaft 12 or near this. For example, the drive 14 can also be fastened on the guide rails for the elevator car 10 and/or the counterweight 32.

In elevator installations with higher operating speeds use is generally made, apart from the above-described support means 20, also of so-called under-cables. They are tensioned around a deflecting roller, which is located in the shaft pit 36, between a car floor and an underside of the counterweight 32. In this manner they shall compensate for the weights of the upper support means 20 and prevent 'jumping' of the elevator car 10 or the counterweight 32 when the counterweight 32 or the elevator car 10 is set down or subjected to safety braking.

3. Drive

In the case of drive 14 of mechanical drives the expert distinguishes between transmissionless drives and drives with transmissions. The significant components of the drives are in that case a motor 16, a brake, a driving pulley 26 or a drum 17 and optionally a transmission. The motor, the brake and in a given case the transmission are in that case preferably constructed, for the purpose of precise alignment and low-noise operation, as an integral subassembly on, for example, a common base plate.

3.1 Motor

The motor 16 of the drive 14 for the elevator installation is usually an electric motor which is matched to the desired parameters, such as acceleration values, travel speeds, sizes of the rated loads, noise conditions, switching frequencies and switch-on duration. Moreover, the motors have to be very robust and capable of overload with respect to their electrical and mechanical part.

The motors used in elevator installations are most frequently three-phase alternating current motors operable at one or more fixed rotational speeds. In the case of higher travel speeds or special demands on stopping accuracy use is preferably made of three-phase alternating current motors, which are regulated in rotational speed by means of frequency converters, or permanent magnet motors.

3.2 Brake

The brake of a drive 14 for an elevator installation is preferably constructed as a mechanically acting friction brake and can serve as a holding brake and/or as a deceleration brake. As a holding brake it has to fix the elevator car 10 at the desired stopping position; as deceleration brake it has the task of safely and precisely bringing the elevator car to a stop at the desired stopping position. Decelerations can also be produced by pole changing in the case of appropriate three-phase alternating current motors or by reduction in the frequency of the motor current in the case of three-phase alternating current or permanent magnet motors.

3.3 Driving Pulley

The driving pulley 26 is a significant component of the drive 14 with driving pulley drive. In that case the driving pulley 26 has to be optimally matched in each instance to the kind of support means 20 used for the elevator installation. Thus, the forces generated by the motor 16 of the drive 14 are, for example, transmitted by way of traction effect from the driving pulley 26 to the support means 20 in the case of a cable-like or belt-like support means 20, whereagainst in the case of a chain-like support means 20 the driving pulley 26 is constructed with a toothed rim.

The traction effect achieved depends very strongly on the exact construction of the cable-like or belt-like support means 20 and the associated driving pulley 26. For example, driving pulley and belt-like support means can have circumferential ribs and circumferential grooves with traction surfaces which are arranged in wedge shape and by way of which they are in contact with one another. Analogously to the action of a wedge belt, it is possible in the case of such a form of embodiment to influence the traction force transmissible from the driving pulley to the support means by selection of the angle between the flanks of the ribs and grooves. Moreover, co-operating ribs and grooves of the driving pulley and the support means serve for lateral guidance of the support means on the driving pulley or on correspondingly constructed deflecting rollers.

The drive 14 in general comprises several parallel driving pulleys 26 or one driving pulley 26 with several parallel force transmission sections, the number of which corresponds with those of the parallelly extending support means 20 of the elevator installation.

The construction and mode of function of the driving pulley 26 according to the invention are described in detail further below in connection with the support means 20 according to the invention.

3.4 Drum

Whereas in the case of a driving pulley drive the support means 20 runs over the driving pulley 26 and is entrained by, for example, traction depending on the respective kind of support means, in the case of a drum drive the support means 20, the length of which has to be matched to the length of the conveying height of the elevator installation, is wound on a drum 18. In most currently known elevator installations with a drum drive the drive 14 with the drum 18 is arranged, by contrast to the simplified illustration of FIG. 1, at the bottom.

4. Support Means 4.1 Construction of the Support Means

Currently, cable-like support means (wire cables), chain-like support means and, increasingly in recent times, also belt-like support means (support belts) come into question as support means for mechanical drives in elevator installations. The present invention in that case relates to improvement of belt-like support means, for which reason at this point there will be no detailed discussion of cable-like and chain-like support means.

The construction, mode of function and production method for a belt-like support means for an elevator installation according to the present invention are described in more detail in the following with reference to FIGS. 3 to 11.

Figure 3:
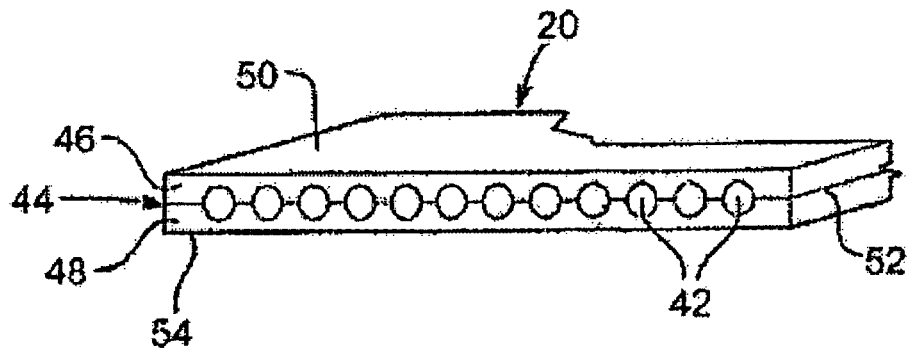
FIG. 3 shows a schematic perspective view of a basic construction of a support belt according to the present invention.

FIG. 3 schematically shows, initially, the outset, the basic construction of a belt-like support means 20 for an elevator installation.

In the case of the support belt illustrated by FIG. 3 several tensile carriers, in particular several cable-like tensile carriers 42, are embedded in a belt-like molded body (belt body) 44. Usable as cable-like tensile carriers 42 within the scope of the present invention are, in particular, cables, strands, cords or braidings of metal wires, steel, synthetic material fibers, mineral fibers, glass fibers, carbon fiber and/or ceramic fibers. The cable-like tensile carriers can each be formed from one or more single elements or from one or more stranded elements.

In one embodiment of the invention each tensile carrier 42 comprises a double-layer core strand with a core wire (for example 0.19 millimeters diameter) and two wire layers (for example 0.17 millimeters diameter) wrapped around this as well as single-layer outer strands, which are arranged around core strand, with a core wire (for example 0.17 millimeters diameter) and a wire layer (for example 0.155 millimeters diameter) wrapped around these. Such a tensile carrier construction which, for example, can have a core strand with 1+6+12 steel wires and eight outer strands with 1+6 steel wires, has proved in tests to be advantageous with respect to strength, manufacturability and capability of bending. Advantageously, in that case the two wire layers of the core strand have the same angle of wrap, whilst the one wire layer of the outer strands is wrapped against the wrap direction of the core strand and the outer strands are wrapped around the core strand against the wrap direction of their own wire layer. However, the present invention is obviously not restricted to tensile carriers 42 with this special tensile carrier construction.

The use of cable-like tensile carriers 42 (also termed cords) with small diameters or thicknesses transversely to the length direction of the support belt 20 makes it possible to use driving pulleys 26 and support pulleys 30, 34a, 34b with small diameters. The diameter of the tensile carrier 42 preferably lies in the range of 1.5 to 4 millimeters. Belt-like support means with such tensile carriers can co-operate with driving pulleys or deflecting pulleys having an outer diameter or effective diameter of less than 100 millimeters, preferably even less than 80 millimeters.

As illustrated in FIG. 3, the belt body 44 of the support belt 20 is constructed from a first belt layer 46 of a first plasticizable material and a second belt layer 48 of a second plasticizable material and has a first outer surface 50 of the first belt layer 46, a connecting plane 52 between the first and the second belt layers 46, 48 and a second outer surface 54 of the second belt layer 48. The plurality of tensile carriers 42 is embedded in the double-layer belt body 44 in the region of the connecting plane 52.

The first outer surface 50 of the first belt layer 46 of the belt body 44 is disposed in engagement with, for example, the traction surface of the driving pulley 26, whilst the second outer surface of the second belt layer 48 is disposed in engagement with the running surfaces of the counterweight support pulley 30 and the two car support pulleys 34a, 34b. However, the support belt 20 of the invention is obviously usable in inverted manner in an elevator installation with driving pulley drive, as is illustrated in FIGS. 2A and 2B, i.e. the first outer surface 50 of the first belt layer 46 of the belt body 44 can equally be disposed in engagement with the traction surface of the driving pulley 26, whilst the second outer surface 54 of the second belt layer 48 is in engagement with the running surfaces of the counterweight support pulley 30 and the two car support pulleys 34a, 34b.

The first material for the first belt layer 46 and the second material for the second belt layer 48 are preferably produced from an elastomer, for example from polyurethane (PUR), ethylene-propylene-diene-rubber (EPDM), acrylnitrile-butadiene-rubber (NBR), polychloroprene (CR) or natural rubber. However, other synthetic materials, such as polyamide (PA), polyethylene (PE), polyethersulfone (PES), polyphenylsulfide (PPS), polytetrafluorethylene (PTFE), polyvinylchloride (PVC) and the like can also be used for the belt layers 46, 48 for forming the molded body 44 of the support belt. However, the invention is not to be restricted to the stated materials. In addition, special adhesion agents can be added to the materials for the first and second belt layers 46, 48 in order to increase the strength of the connection between the belt layers 46, 48 and between the first belt layer 46 and the tensile carriers 42. In addition, the intercalation of further fabrics, fabric fibers or other fillers is also possible.

As explained further below in more detail, the first and second belt layers are each formed in an extrusion process. Thermoplastic elastomers are preferably used as materials for that purpose. In principle, it is also possible to use vulcanizable elastomers or rubber material, wherein the final vulcanization can be carried out only after the extrusion process so as to have a flowable material for the extrusion process.

According to the invention it is possible to use for the first belt layer 46 and the second belt layer 48 in each instance the same material with the same characteristics, in each instance the same material with different characteristics, or different materials. Important characteristics of the material or materials for the molded body 44 are, in particular, the elasticity, the coefficient of friction, the wear resistance, the flowability during extrusion, the capability of bonding with the cable-like tensile carriers 42, the color, the light resistance and the like.

In special embodiments of the invention at least one of the belt layers 46, 48 can be formed from a transparent material so as to facilitate checking of the support belt 20 for damage, particularly for broken tensile carriers 42. Moreover, the first and/or the second belt layer can be constructed with an antistatic quality, i.e. from a material which is not electrostatically chargeable. In a further embodiment, for example, the second belt layer can be of luminescent construction so as to render the rotation of the driving pulley or the drum recognizable or to produce defined optical effects.

The embedding of the cable-like tensile carriers 42 in the first belt layer 46 produces a lubrication of its individual wires in the case of mutual movement thereof in use in an elevator installation. Moreover, the tensile carriers 42 are thus additionally protected against corrosion and held precisely in their desired positions.

In order to increase the pressing pressure of the support means 20 against a driving pulley 26 it is advantageous, with respect to an increase in the traction capability or drive capability, to construct those contact surfaces of the belt body 44 which co-operate with the driving pulley 26, i.e. the first or the second outer surface 50, 54, with so-called (wedge) ribs (not illustrated in FIG. 3). The ribs extend as longitudinal elevations in the direction of the length of the support belt 20 and preferably come into engagement with correspondingly shaped grooves on the running surface of the driving pulley 26. At the same time, the wedge ribs guarantee, by their engagement in the grooves at the driving pulley 26, a lateral guidance of the support belt 20 on the driving pulley 26.

Moreover, the two outer surfaces 50, 54 of the support belt 20 of the invention can be provided over the entire length thereof or only in corresponding part-sections, in which they come into contact with the driving pulley 26 and the various supporting and deflecting pulleys of the elevator installation, with a special surface property which, in particular, influences the slide characteristics of the support belt 20. For example, the outer surface 50, 54, which mates with the traction surface of the driving pulley 26, of the support belt can be provided with a traction-reducing coating, surface structure or the like. Alternatively, the support belt 20 can also be sheathed at one or both of the outer surfaces 50, 54 with a fabric or the like so as to influence the characteristics of the support belt surface.

It is, in principle, possible to provide several differently constructed support belts 20 of the described kind in one elevator installation.

4.2 Production of the Support Belt

The production method of the support belt 20 of the invention and the corresponding device for producing the support belt are now explained in detail with reference to FIGS. 4 to 7.

Figure 4A:
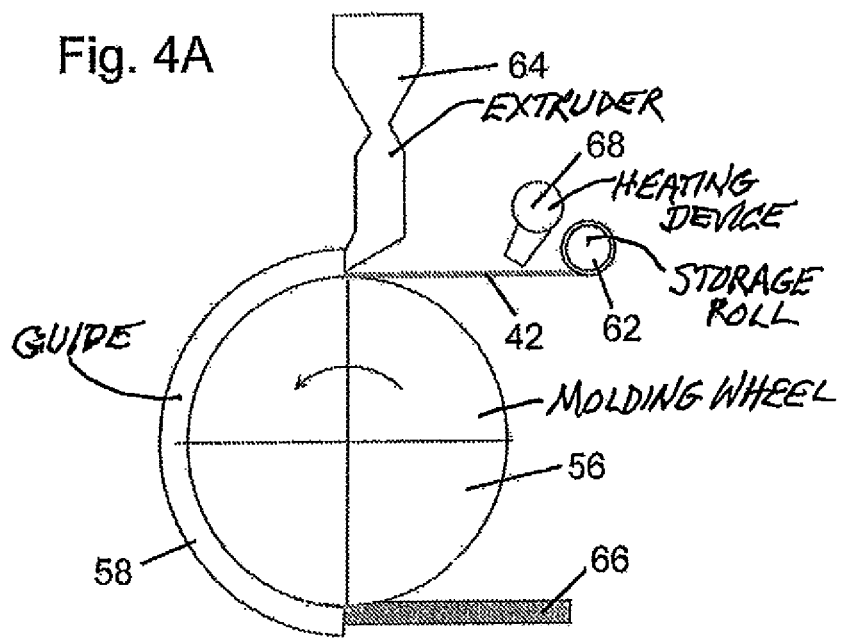
FIGS. 4A and 4B show schematic illustrations of the construction and mode of function of a first station for production of the support belt illustrated in FIG. 3.
Figure 4B:
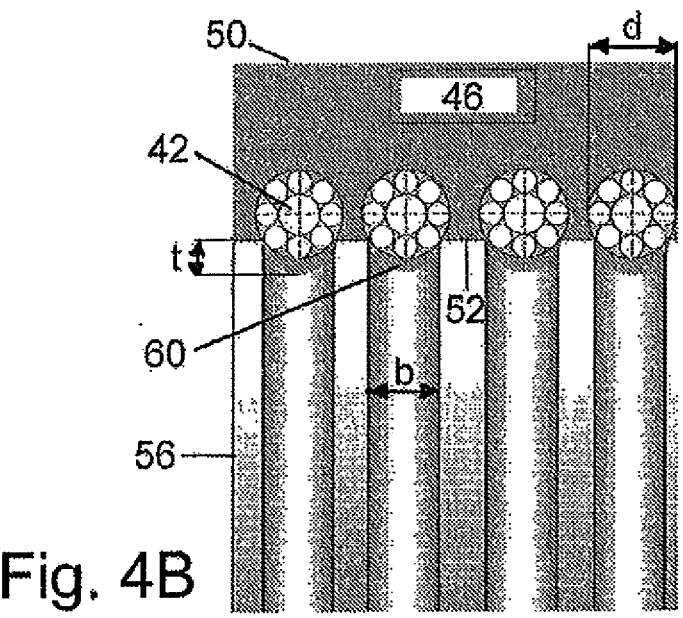

The method for producing the support belt 20 with a first belt layer 46 and a second belt layer 48 and cable-like tensile carriers 42 embedded therein is a two-stage method. The first production station of this two-stage production method is illustrated in FIG. 4A and the second production station is illustrated in FIG. 4B. It is to be noted that the first and second production stations are directly connected one behind the other as separate production stations or within an integral production process.

As illustrated in FIG. 4A, the first production station for the support belt 20 of the invention comprises a first rotating molding wheel 56 and a first guide 58 looping around a circumferential section of this first molding wheel 56. This first guide 58 can be formed from, for example, an endless molding belt which is guided over several rollers and which together with the circumferential surface of the first molding wheel 56 and two guide ribs 61 protruding therefrom forms a mold cavity such as disclosed in, for example, DE 102 22 015 A1 cited in the introduction. Alternatively, the first guide 58 can be a stationary outer wall of the said mold cavity, which forms it together with the circumferential surface of the first molding wheel 56 and the two guide ribs 61 protruding therefrom. In this case, the side of the first guide 58 facing the molding wheel is advantageously provided with a slide element, for example a slide covering of PTFE, so as to facilitate relative movement between the first guide 58, which forms the stationary outer wall of the mold cavity, and the extruded molded body, which circulates together with the molding wheel 56, of the resulting part-belt 66.

Figure 5:
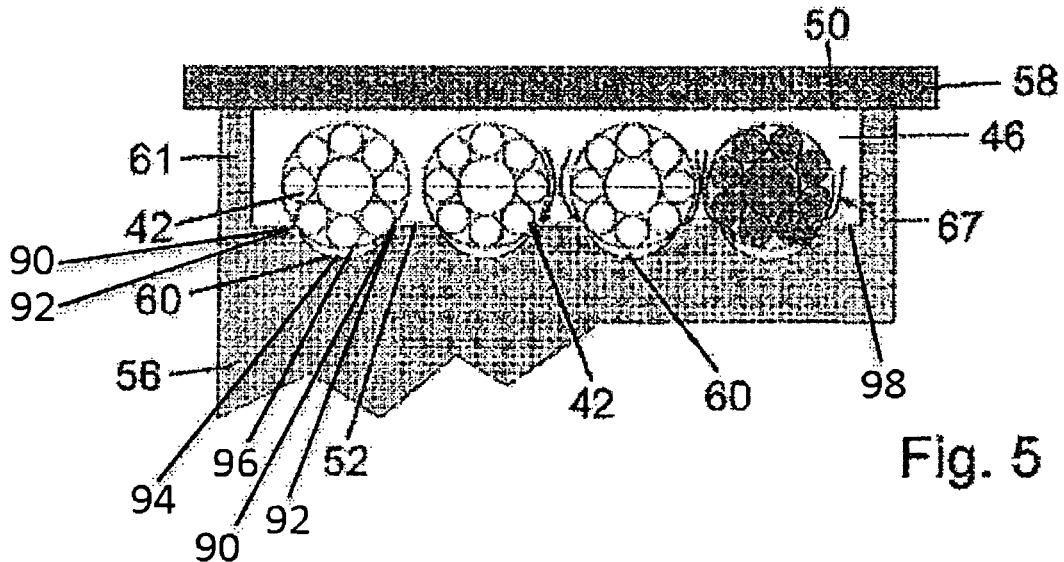
FIG. 5 shows a schematic illustration for explanation of the mode of function of the first station illustrated in FIGS. 4A and 4B.

The circumferential surface 98 as shown in FIG. 5 of the first molding wheel 56 is constructed with several longitudinal grooves 60, which extend along the circumferential direction of the molding wheel as illustrated in FIG. 4B. The width of the circumferential surface of the molding wheel 56, which is preferably bounded by suitable lateral guide elements 61 (see FIG. 5), corresponds with the desired width of the support belt 20 and the number of longitudinal grooves 60 in the circumferential surface of the first molding wheel 56 corresponds with the desired number of the cable-like tensile carriers 42 in the support belt 20.

As illustrated in FIG. 4B, the width b of the guide grooves 60 is selected to be smaller than the diameter d of the tensile carriers 42. For example, the width b of the groove 60 lies in a range of approximately 70% to 95% of the diameter d of the tensile carriers 42, particularly preferably in a range of approximately 75% to 90%. Moreover, the depth t of the longitudinal grooves 60 lies in a range of approximately 25% to 50%, preferably in a range of approximately 30% to 40%, of the diameter d of the tensile carriers 42.

In the first production station of FIG. 4A the cable-like tensile carriers 42 are now fed from a storage roll 62 to the first molding wheel 56, wherein they are guided into the longitudinal grooves 60 of the circumferential surface of the first molding wheel 56 and preferably held under bias. By virtue of the above-described dimensioning of the width b and the depth t of the guide grooves 60 in relation to the diameter d of the tensile carriers 42 the tensile carriers 42 are received only partly in the longitudinal grooves 60. The tensile carriers 42 contact the first molding wheel 56 only along the rim edges 90 of the longitudinal grooves 60 thereby forming contact points 92, so that free spaces 94 or cavities are present between the tensile carriers and the first molding wheel 56 in the regions of the longitudinal grooves 60 as shown in FIG. 5. A portion of the at least one tensile carrier 42 protrudes partly out of the connecting plane 52, thereby forming a protruding portion 96.

A flowable flow of the first material is dispensed from a first extruder 64 substantially without pressure into the mold cavity formed between the first molding wheel 56 and the first guide 58, wherein the at least one tensile carrier 42 rests on the circumferential surface of the first molding wheel 56 before the flow of the first material enters the mold cavity. The material flow from the first extruder 64 is pressed by the first guide 58 against the tensile carriers 42 and the first molding wheel 56 and thus obtains its final shape so as to ultimately form the part-belt 66 with the first belt layer 46 and the tensile carriers 42 embedded therein. The first outer surface 50 of the part-belt 66 or of the support belt 20 in that case faces the guide 58 and the surface of the part-belt 66 forming the connecting plane 52 faces the first molding wheel 56.

As illustrated in FIG. 5, in this embedding process the flowable first material also flows into the cavities within the cable-like tensile carriers 42 and through these cavities as well as through the free spaces 94 to substantially cover an external surface of the protruding portion 96, which are formed by virtue of the twisting of the tensile carriers 42, between the tensile carriers 42 and the first molding wheel 56 (see flow lines 67 indicated in FIG. 5 by arrows) also into the free spaces 94 or cavities, defined as areas which are formed between the tensile carriers 42 and the corresponding grooves 60 and between the contact points 92, of the mold cavity. The penetration of the first material into these free spaces 94 or cavities is facilitated in that the tensile carriers contact the first molding wheel 56 only at the contact points 92, that is, only along the rim edges 90 of the longitudinal grooves 60, so that the tensile carriers 42 by their twisted outer strand wires hardly obstruct inflow of the material into the cavities between the tensile carriers and the first molding wheel 56. In this manner, on the one hand the cavities within the cable-like tensile carriers 42 are at least partly filled with the first material, whereby a very good connection between the tensile carriers 42 and the first belt layer 46 of the first material results. On the other hand, the tensile carriers 42 are embedded as fully as possible in the first belt layer 46, so that no direct contact exists between the embedded tensile carriers 42 and the second belt layer 48 subsequently molded on at the connecting surface 52.

The characteristics of the first plasticizable material (particularly its viscosity) and the process parameters of the first production station (particularly temperature and pressure) are in that case to be selected in such a manner that the first material during the embedding step can penetrate into the cavities within the cable-like tensile carriers 42 and the cavities between the tensile carriers 42 in the first molding wheel 56, as explained above with reference to FIG. 5.

In the exemplifying embodiment illustrated in FIGS. 4 and 5 the at least one tensile carrier 42 of the support belt 20 after the first production step in the first production station protrudes by approximately 5% to 20% (the protruding portion 96) of its diameter relative to the connecting surface 52 of the part-belt 66. In that case, more than 80%, preferably more than 90%, particularly preferably more than 95%, of the surface of the at least one tensile carrier 42 is covered by the first plasticizable material of the first belt layer 46.

In order to further improve the connection between the first plasticizable material for the first belt layer 46 and the tensile carriers 42 to be embedded it is of advantage if the tensile carriers 42 are heated during the embedding process. For this purpose, for example, a first heating device 68 for heating the tensile carriers 42 to be fed to the first molding wheel 56 is so arranged that the tensile carriers are heated before they run onto the molding wheel 56.

Although not illustrated in FIGS. 4 and 5, the first guide 58 can be profiled at its inner side facing the first molding wheel 56 so as to impart a profile to the first outer surface 50 of the part-belt 66 or of the finished support belt 20. In particular, it is possible to provide the first outer surface 50 of the support belt 20 with ribs or wedge ribs extending in longitudinal direction, as is later discussed in connection with special forms of embodiment of the support belt 20 with reference to FIGS. 8 to 10. Alternatively or additionally, further surface structures can also be introduced into this outer surface 50. The profiling or structuring of the first outer surface 50 of the support belt 20 in that case is carried out in advantageous manner during the embedding step of the at least one tensile carrier 42 in the first belt layer 46.

According to a preferred alternative method, in the said embedding step the part-belt 66 is extruded with an unprofiled plane forming the first outer surface 50 of the support belt 20. After the subsequently described second production step the support belt 20 is so re-processed in a separate, further production step that it has the afore-mentioned ribs extending in longitudinal direction of the support belt. Advantageously, this re-processing of the support belt is carried out by grinding with profiled grinding discs, which are particularly suitable for grinding elastomeric materials. The removed material is in that case sucked away and recycled.

Figure 6:
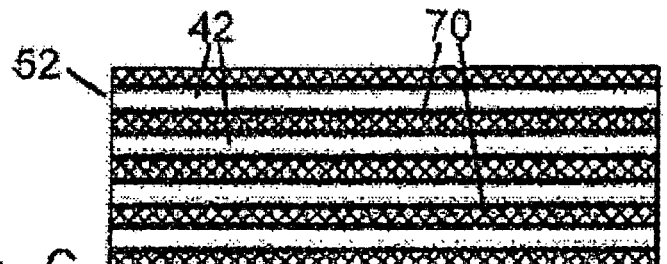
FIG. 6 shows a schematic illustration of a part-belt, which is produced in the first station of FIGS. 4A and 4B, according to a special form of embodiment.

In an advantageous development of the invention the first molding wheel 56 or its circumferential surface is constructed in such a manner that the connecting surface 52 of the part-belt 66 is provided with a surface structure during the embedding step. As indicated in FIG. 6, preferably at least the sections of the connecting surface 52 between the tensile carriers 42 are constructed with a surface structure 70, for example in the form of a grid-shaped or irregular roughening, knurling or rippling. In addition, however, the regions of the tensile carriers 42 in the connecting surface 52 can also be constructed with a surface structure 70. Such a surface structure 70 increases the area of the connecting surface 52 and thus improves the later connection with the second belt layer 48.

After production of the part-belt 66 in the first production station according to FIGS. 4A and 4B production of the support belt 20 in a second production station, which is shown by way of example in FIGS. 7A and 7B, is carried out.

As is illustrated in FIG. 7A, the second production station comprises, similarly to the first production station for the support belt 20, a second molding wheel 72 rotating in anti-clockwise sense and a second guide 74 looping around a circumferential section of this second molding wheel 72. This second guide 74 can be formed, for example, like the first guide 58 of the first molding wheel 56 from an endless molding belt which is guided over a plurality of rollers and which together with the circumferential surface of the second molding wheel 72 and two guide ribs, which are not illustrated here and which protrude from the circumferential surface, forms a mold cavity. Alternatively, the second guide 74 can be a stationary outer wall of the mold cavity, which forms it together with the circumferential surface of the second molding wheel 72 and two guide ribs protruding therefrom. In this case, the side of the second guide 74 facing the molding wheel 72 is advantageously provided with a slide element in order to facilitate relative movement between the second guide 74, which forms the stationary outer wall of the mold cavity, and the extruded molded body, which circulates with the molding wheel 72, of the resulting second belt layer 48.

By contrast to the first production station of FIGS. 4A and 4B the second molding wheel 72 of the second production station is constructed with a circumferential surface corresponding with the profile of the first outer surface 50 of the first belt layer 46 or of the part-belt 66. In the exemplifying embodiment shown in FIG. 7B a flat circumferential surface is provided for the second molding wheel 72 for the case that the first outer surface 50 of the support belt 20 is not to have a profile, i.e. is to have a flat surface structure, or for the case that the outer surface 50 is profiled only by re-processing. The width of the circumferential surface of the second molding wheel 72, which is preferably bounded by suitable lateral guide elements (not illustrated), corresponds with the desired width of the support belt 20.

In the second production station according to FIG. 7A the part-belt 66 produced in the above-described first production station is so fed to the second molding wheel 72 that the first outer surface 50 of the part-belt 66 stands in contact with the circumferential surface of the second molding wheel 72. A flowable flow of the second plasticizable material is dispensed from a second extruder 76 substantially without pressure into the mold cavity formed between the second molding wheel 72 and the second guide 74. The material flow from the second extruder 76 is pressed by the second guide 74 against the connecting surface of the part-belt 66 and is molded thereat as the second belt layer 48. In that case the second belt layer 48 receives its final form and ultimately forms together with the first belt layer 46 and the tensile carriers 42 embedded between the two belt layers the support belt 20. The second outer surface 54, which is formed by the second belt layer 48, of the support belt 20 in that case faces the guide 74.

As illustrated in FIG. 7B, in this molding-on process the flowable second material flows against the entire surface of the part-belt 66 forming the connecting plane 52. In the case of a surface structuring 70 of this connecting surface 52 as explained above, the connection between the first and second belt layers 46, 48 is particularly good. Since the tensile carriers 42 were, in the first production station, embedded as fully as possible in the first belt layer 46, the second belt layer 48 hardly comes into contact or does not even come into contact with the tensile carriers 42.

In order to further improve the connection between the second plasticizable material for the second belt layer 48 and the previously produced part-belt 66 it is of advantage if the part-belt 66 is heated during the described molding-on process. For this purpose, for example, a second heating device 78 for heating the part-belt 66 to be fed to the second molding wheel 72 is so arranged that the part-belt is heated before it runs onto the second molding wheel 72.

Although not illustrated in FIGS. 7A and 7B, the second guide 74 can also be profiled at its inner side facing the second molding wheel 72 so as to impart a profile to the second outer surface 54 of the finished support belt 20. In particular, it is possible to also provide the second outer surface of the support belt 20 with ribs or wedge ribs running in longitudinal direction, as is discussed later in connection with special forms of embodiment of the support belt 20 with reference to FIGS. 8 to 10. Alternatively or additionally, further surface structures can also be introduced into this second outer surface 54. This profiling or structuring of the second outer surface 54 of the support belt 20 in that case is carried out in advantageous manner during the molding-on process in the second production station.

According to a preferred alternative method, in the course of the said molding-on process the second belt layer 48 is extruded with an unprofiled plane forming the second outer surface 54 of the support belt 20. After the subsequently described second production process the support belt 20 is so re-processed in a separate, further production step that it has the afore-mentioned ribs extending in the longitudinal direction of the support belt. Advantageously, this re-processing of the support belt is carried out by grinding with profiled grinding discs, which are specifically suitable for the grinding of elastomeric materials. The removed material is in that case sucked away and recycled.

As already mentioned above, the same or different materials with the same or different characteristics can be selectably used for the first and second belt layers 46, 48. By virtue of the two-stage production method it is of advantage if the second material has a lower flow temperature or melt temperature than the first material so that if need be the material flow fed by the second extruder 76 in the second production station softens the surface of the first belt layer 46 at the connecting surface 50 so as to achieve a better connection between the two materials, but does not soften the entire part-belt 66. It can thus be ensured that the shape of the entire part-belt 66 with the tensile carriers 42 enclosed by the first material remains virtually unchanged.

In a preferred exemplifying embodiment a softer material is selected for the second belt layer 48 of the support belt 20 than for the first belt layer 46 of the support belt 20. For example, the first material for the first belt layer 46 has a Shore hardness of approximately 85 at room temperature, whilst a second material with a Shore hardness of approximately 80 at room temperature is used for the second belt layer 48.

In the above exemplifying embodiment of the production method it was described that the first and the second outer surfaces 50, 54 in the first and second production stations can be selectably constructed with planar surfaces or with a profile. Moreover, it is possible to provide one or both of the outer surfaces 50, 54 by an additional coating, vapor deposition, flock-coating or the like (not illustrated) so as to selectively change the surface characteristics, particularly the friction characteristics, of the surfaces of the support belt 20. This surface processing can be used selectably on the complete outer surfaces 50, 54 or only a part of the outer surfaces, such as, for example, the flanks of wedge ribs forming these outer surfaces. A coefficient of friction of $\mu \leq 0.3$, for example, is preferred for the second belt layer 48, which comes into contact with the deflecting pulleys.

4.3 Special Forms of Embodiment of the Support Belt

Various preferred forms of embodiment of a support belt 20, which are producible by the above-described production method according to the invention, are now described with reference to FIGS. 8 to 10.

Figure 8:
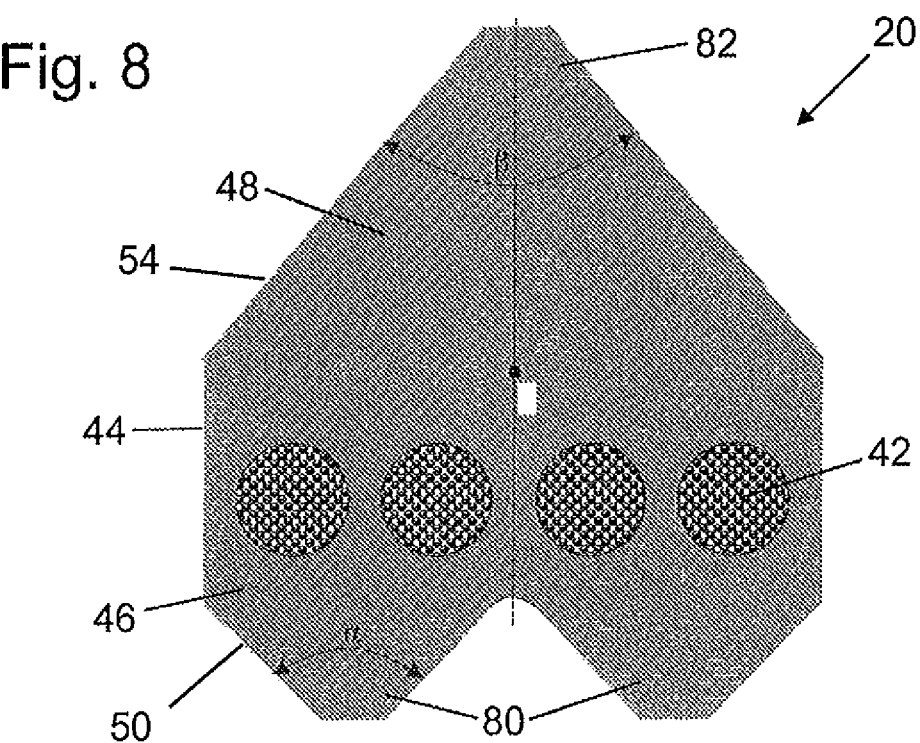
FIG. 8 shows a schematic sectional view of a support belt according to a first exemplifying embodiment of the invention, which is produced in accordance with the method of the invention.

In the first exemplifying embodiment according to FIG. 8 the support belt 20 comprises a molded body 44, which is formed from a first belt layer 46 and a second belt layer 48 and in which a tensile carrier arrangement with a total of four cable-like tensile carriers 42 is arranged. The first outer surface 50 of the first belt layer 46 is provided for contact with the driving pulley 26. It has for this purpose two drive ribs in the form of wedge ribs 80, which engage in associated grooves of the driving pulley 26 and are laterally guided by this, wherein the pressing-on forces and thus the traction capability of the drive increase as a consequence of the wedge action.

The second outer surface 54 of the second belt layer 48 is provided for contact with the car support pulleys 34a, 34b and has for this purpose a guide rib in the form of a wedge rib 82, which engages in an associated roller of the deflecting pulleys 34a, 34b and is laterally guided by these.

In the exemplifying embodiment of FIG. 8 the total height of the support belt 20 is dimensioned to be greater than its total width. The stiffness in bending of the support belt 20 about its transverse axis is thereby increased and thus jamming in the grooves of the driving pulley 26 and the support pulleys 30, 34a, 34b is counteracted. In the illustrated example the ratio of total width to total height is approximate 0.90.

The flank angle $\alpha$ of the drive ribs 80 of the first belt layer 46 is defined as an inner angle between the two flanks of a drive rib 80 and in the exemplifying embodiment is approximately 90° (in general between 60° and 120°). The correspondingly defined flank angle $\beta$ of the guide rib 82 of the second belt layer 48 is in this example approximately 80° (in general between 60° and 100°).

As apparent in FIG. 8, the flank height of the guide rib 82 is greater than the flank height of the two drive ribs 80. The guide rib 82 can thereby dip deeper into a corresponding groove of the deflecting pulleys 30, 34a, 34b than is the case with the drive ribs 80 and the associated grooves of the driving pulley 26. Equally, it is apparent in FIG. 8 that the flank width of the guide rib 82 is also larger than that of the two drive ribs 80. Through this larger flank width of the guide rib 82 the support belt 20 is guided on its second outer side 54 over a wider region in transverse direction, whereby the risk of jumping of the support belt out of its guide groove in the deflecting pulley is reduced.

As indicated in FIG. 8, the wedge ribs 80, 82 each have a flattened tip with a width which is at least as large as the minimum spacing of the corresponding counter-flanks of the grooves of the pulleys 26, 30, 34a, 34b. It is thereby avoided that the tips of the wedge ribs contact the base of the corresponding wedge grooves in the stated pulleys and thus are protected against a corresponding concentration of stress.

The first outer surface 50 can have a coating with a PA film or the like at least in those regions of the wedge ribs 80 which enter into frictional couple with the flanks of the driving pulley 26. Moreover, the possibility exists of providing a wedge rib 80 with a coating reducing the coefficient of friction and/or noise.

A support belt 20, as has been described above with reference to FIG. 8, is explained in detail, for example, in EP 06127168.0 of the applicant, which is not yet published and to which reference is accordingly made in terms of the complete content with respect to the construction and shape of the support belt 20.

Figure 9:
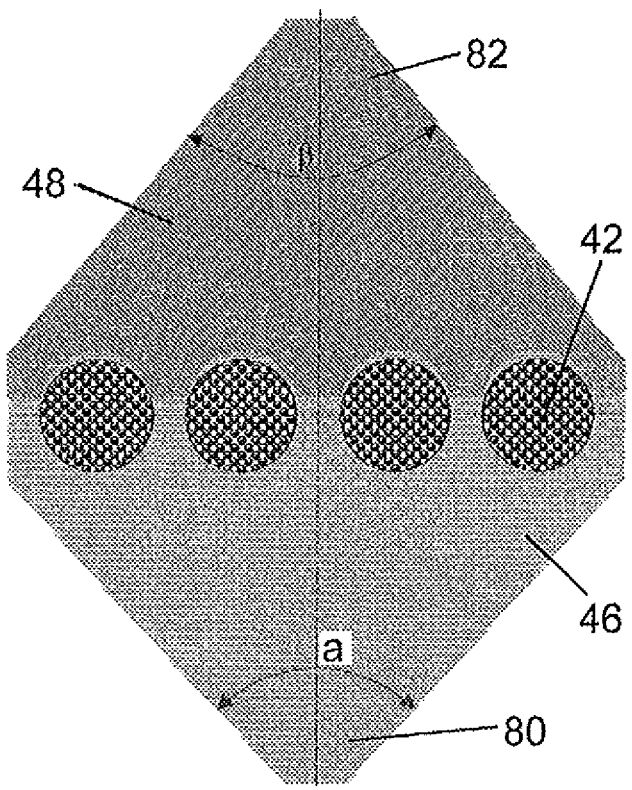
FIG. 9 shows a schematic sectional view of a support belt according to a second exemplifying embodiment of the invention, which is produced according to the method of the invention.

The second exemplifying embodiment of a support belt 20 illustrated in FIG. 9 differs from the above-described example in that, instead of the two wedge ribs 80 on the side of the first belt layer 46, only one wedge rib 80 is constructed. This one wedge rib 80 also has a flank angle α of approximately 90° (in general between 60° and 120°) and a flattened tip. Overall, in the case of this support belt 20 a V-shaped profile results not only at the first, but also at the second outer surface 50, 54. The support belt disclosed by FIG. 9 has overall a cross-section geometrically corresponding with a kite quadrilateral (deltoid). If the flank angles α and β are of the same size, then the overall cross-section of the support belt corresponds with a lozenge (rhombus). Such a support belt has the advantage that it can be guided by its two sides around driving and deflecting pulleys which are provided with identically shaped wedge grooves.

Figure 10:
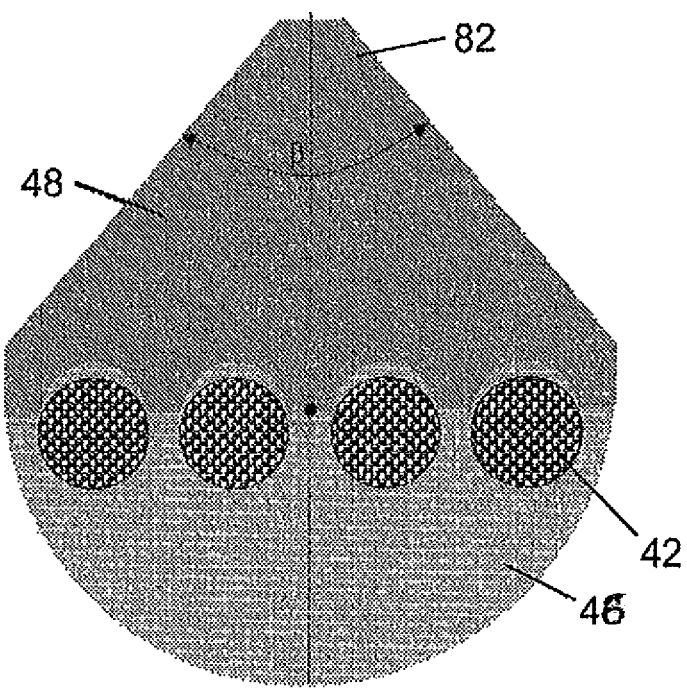
FIG. 10 shows a schematic sectional view of a support belt according to a third exemplifying embodiment of the invention, which is produced according to the method of the invention.

FIG. 10 shows a third exemplifying embodiment of the support belt 20. This differs from the support belt 20 illustrated in FIG. 9 in that the wedge rib 80 of the first belt layer 46 is constructed to be rounded overall.

It is obvious that the exemplifying embodiments of FIGS. 8 to 10 are only by way of example and the invention is not to be restricted to these special shapes of the support belt 20. The expert will readily recognize further variants of the support belt which can be made by the above-described production method of the invention.

Figures 11A, 11B:
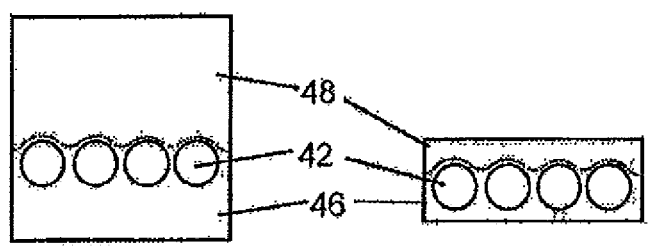
FIGS. 11A and 11B show schematic sectional views of two variants of a support belt, which is produced in accordance with the method according to the invention.

Although in the exemplifying embodiments of FIGS. 8 to 10 in each instance the total height of the support belt 20 was dimensioned to be greater than its total width, the invention is obviously not restricted thereto. As indicated in FIGS. 11A and 11B, the present invention embraces not only support belts 20 in which the height is greater than the width (FIG. 11A), but also support belts 20 in which the width is greater than the height (FIG. 11B). Beyond that, not only rectangular, but also square cross-sectional shapes are conceivable for the support belt 20. The ratio of the total width to the total height of the support belt 20 preferably lies in the range between 0.8 and 1.2, particularly preferably in the range between 0.9 and 1.1.

In the above exemplifying embodiment the production of a support belt 20 with a specific width and a specific number of embedded tensile carriers 42 and wedge ribs 80, 82 was described. However, particularly in the case of narrow support belts 20 (i.e. height/width >1), as shown by way of example in FIGS. 8 to 10, it is also possible within the scope of the invention to allow several such support belts 20 to run at the same time adjacent to one another through respectively correspondingly conceived first and second production stations.

According to a variant of such a parallel production initially a wide belt of the width of several support belts 20 with a large number of tensile carriers 42 is produced and is subsequently divided up into several individual support belts 20. Various mechanical methods such as cutting, sawing, etc., are conceivable for that purpose. For simplification of the dividing process frangible locations can also be provided in the wide belt to extend in its longitudinal direction. For dividing up such a wide belt with frangible locations into individual support belts 20 a driving pulley 26 can be provided in which increased spacings between two adjacent grooves are present in the region of desired separating points, whereby when the elevator installation is placed in operation the wide belt is spread apart at these locations and thereby separated, so that ultimately several individual support belts 20 are in use in the elevator installation.

For simpler handling during transport and assembly several support belts 20 with a support band or assembly band, for example of synthetic material or the like, can be connected together. The support band or the assembly band is preferably removed from the support belt 20 after mounting of the support belt in an elevator installation. This method is explained in more detail in, for example, EP 06118824.9 of the applicant, which is not yet published and to which reference in terms of the full content is accordingly made with respect thereto.

4.4 End Fastening Means (for Fastening the Free Ends of the Support Belt)

For secure fastening of the free ends 28a, 28b of the cable-like or belt-like support means 20 different end fastening means can be provided. The free ends of wire cables can be fixed by, for example, wedge locks, encapsulating, splicing or other methods; those of support belts are usually fastened by wedge locks, wherein the components, which co-operate with the ribbed sides of the support belt, of the wedge locks are preferably provided with corresponding grooves.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of producing a support belt for an elevator installation, comprising the steps:
    providing at least one tensile carrier formed as a cable;
    forming a free space as an area between an external surface of the at least one tensile carrier and a molding device and between opposing contact points of the at least one tensile carrier and rim edges of the molding device;
    embedding the at least one tensile carrier in a first belt layer formed of a first plasticizable material to form a part-belt with a first outer surface and a connecting plane surface wherein the at least one tensile carrier protrudes partly out of the connecting plane surface of the part-belt at the free space thereby forming a protruding portion, and the protruding portion of the at least one tensile carrier is covered at least partly by the first plasticizable material; and molding on the part-belt a second belt layer of a second plasticizable material at the connecting plane surface and the protruding portion of the at least one tensile carrier to form an elevator support belt with the first outer surface on the first belt layer and a second outer surface on the second belt layer.

2. The method according to claim 1 wherein the at least one tensile carrier is covered in the embedding step in a range of 80% to 95% with the first plasticizable material.

3. The method according to claim 1 wherein the free spaces within the at least one tensile carrier are filled at least partly with the first plasticizable material during the embedding step.

4. The method according to claim 1 wherein the first plasticizable material and the second plasticizable material are a same material.

5. The method according to claim 4 wherein the first plasticizable material and the second plasticizable material have different characteristics.

6. The method according to claim 1 wherein the connecting plane surface is provided at least in part with a surface structure before performing the molding step.

7. The method according to claim 6 wherein the connecting plane surface is provided with the surface structure during the embedding step.

8. The method according to claim 1 including forming a rib on at least one of the first outer surface and the second outer surface, the at least one rib extending in a longitudinal direction of the support belt.

9. The method according to claim 1 including at least one of forming at least one rib on the first outer surface during the embedding step and forming at least one rib on the second outer surface during the molding step.

10. The method according to claim 1 wherein at least one of the embedding step and the molding step is performed as an extrusion process.

11. The method according to claim 1 including at least one of steps of:
   forming the first belt layer and the second belt layer by a same or different process parameters;
   placing the at least one tensile carrier under bias during the embedding step;
   heating the at least one tensile carrier during the embedding step; and
   heating the connecting plane surface of the part-belt during the molding step.

12. A device for producing a support belt for an elevator installation, comprising:
   a first production station for forming a part-belt having a first outer surface and a connecting plane surface, wherein said first production station includes a first molding wheel, the molding wheel configured to form a free space in an area between an external surface of at least one tensile carrier and the molding wheel and between opposing contact points of the at least one tensile carrier and rim edges of the molding wheel, a first guide looped around a part-circumference of said first molding wheel, equipment for feeding at least one tensile carrier to said first molding wheel and a first extruder for feeding a first plasticizable material into a mold cavity formed between said first molding wheel and said first guide, the first extruder configured to feed the first plasticizable material into the free space such that a portion of the at least one tensile carrier at the free space is covered at least partially by the first plasticizable material; and
   a second production station for forming the support belt with the first outer surface and a second outer surface, wherein said second production station includes a second molding wheel, a second guide looped around a part-circumference of said second molding wheel, equipment for feeding the part-belt to said second molding wheel and a second extruder for feeding a second plasticizable material into a mold cavity formed between said second mold wheel and said second guide, wherein a circumferential surface of said first molding wheel has at least one longitudinal groove that extends in a circumferential direction of said first molding wheel and into which said at least one tensile carrier is guided, a width of said longitudinal groove at said circumferential surface being smaller than a diameter of said at least one tensile carrier wherein a portion of said at least one tensile carrier protrudes partly out of a connecting surface of said first plasticizable material and said portion is covered at least partly by said first plasticizable material.

13. The device according to claim 12 wherein a width of said at least one longitudinal grooves is in a range of 70% to 95% of a diameter of said at least one tensile carrier.

14. The device according to claim 12 wherein a depth of said at least one longitudinal groove is in a range of 25% to 50% of a diameter of said at least one tensile carrier.

15. The device according to claim 12 including at least one of:
   a storage roll at said first production station for feeding said at least one tensile carrier under bias to said first molding wheel;
   a first heating device at said first production station for heating said at least one tensile carrier prior to feeding to said first molding wheel;
   said first guide being profiled at a side facing said first molding wheel to form a profile on said first outer surface of said part-belt;
   a second heating device at said second production station for heating said part-belt prior to feeding to said second molding wheel; and
   said second guide being profiled at a side facing said second molding wheel to form a profile on said second outer surface of said support belt.

* * * * *